(12) United States Patent
Dvorsky et al.

(10) Patent No.: US 11,171,688 B2
(45) Date of Patent: Nov. 9, 2021

(54) SYSTEMS AND METHODS FOR MACHINE CONDITION MONITORING

(71) Applicant: Nikola Labs, Westerville, OH (US)

(72) Inventors: James Dvorsky, Plain City, OH (US); Roland Kyle Tallos, Polk, OH (US); Jonathan Eric Turner, Lewis Center, OH (US); Brock Joseph DeLong, Dublin, OH (US); Ryan Somogye, Grove City, OH (US)

(73) Assignee: Nikola Labs, Westerville, OH (US)

( * ) Notice: Subject to any disclaimer, the term of this patent is extended or adjusted under 35 U.S.C. 154(b) by 0 days.

(21) Appl. No.: 16/802,746

(22) Filed: Feb. 27, 2020

(65) Prior Publication Data

US 2020/0204213 A1    Jun. 25, 2020

Related U.S. Application Data

(62) Division of application No. 16/384,547, filed on Apr. 15, 2019, now Pat. No. 10,707,921.
(Continued)

(51) Int. Cl.
*H04B 5/00* (2006.01)
*H04W 4/80* (2018.01)
(Continued)

(52) U.S. Cl.
CPC ......... *H04B 5/0037* (2013.01); *G06F 1/3206* (2013.01); *H04B 5/02* (2013.01); *H04W 4/80* (2018.02)

(58) Field of Classification Search
CPC ...... H04B 5/0037; H04B 5/02; H04B 5/5056; H04B 7/0682; H02J 50/20; H02J 50/50;
(Continued)

(56) References Cited

U.S. PATENT DOCUMENTS

| 5,920,827 A | 7/1999 | Baer et al. |
| 2003/0076168 A1 | 4/2003 | Forrester |

(Continued)

FOREIGN PATENT DOCUMENTS

| DE | 202017106905 U1 | 3/2018 |
| WO | 2017214611 A1 | 12/2017 |

OTHER PUBLICATIONS

Invitation to Pay Additional Fees and, Where Applicable, Protest Fee in International Application No. PCT/US19/27527, dated Jun. 12, 2019 (2 pages).
(Continued)

*Primary Examiner* — Ankur Jain
(74) *Attorney, Agent, or Firm* — Kern Kendrick, LLC; Benjamen E. Kern

(57) ABSTRACT

Systems and methods can include a transponder configured to communicate wirelessly with a receiver and sensor module (RSM), wireless communicate with a high-speed network, and radio-frequency (RF) powering of RSM. The high-speed network can include a wired network such as USB or Ethernet, or wireless network such as a WiFi or cellular network. Additionally or alternatively, an antenna module can be configured to transmit radio-frequency (RF) power to a receiver configured to monitor a condition of a machine.

19 Claims, 11 Drawing Sheets

Related U.S. Application Data

(60) Provisional application No. 62/662,824, filed on Apr. 26, 2018, provisional application No. 62/657,959, filed on Apr. 16, 2018, provisional application No. 62/657,960, filed on Apr. 16, 2018.

(51) Int. Cl.
*G06F 1/3206* (2019.01)
*H04B 5/02* (2006.01)

(58) Field of Classification Search
CPC ... H04W 52/0235; H04W 88/02; H04W 4/80; H04W 4/38; G06F 1/3206
See application file for complete search history.

(56) References Cited

U.S. PATENT DOCUMENTS

| | | |
|---|---|---|
| 2013/0278209 A1 | 10/2013 | Von Novak, III et al. |
| 2014/0125250 A1 | 5/2014 | Wilbur |
| 2015/0116127 A1 | 4/2015 | Lynch et al. |
| 2016/0268694 A1 | 9/2016 | Ma et al. |
| 2017/0358950 A1* | 12/2017 | Zeine .................. H04B 7/0682 |
| 2018/0139698 A1 | 5/2018 | Quinlan |
| 2018/0351412 A1 | 12/2018 | Gabriel |

OTHER PUBLICATIONS

International Search Report and Written Opinion in International Application No. PCT/US19/27527, dated Aug. 7, 2019 (14 pages).

* cited by examiner

SYSTEMS AND METHODS FOR MACHINE CONDITION MONITORING

CROSS REFERENCE TO RELATED APPLICATIONS

This is a divisional application of U.S. patent application Ser. No. 16/384,547, filed Apr. 15, 2019, titled "SYSTEMS AND METHODS FOR MACHINE CONDITION MONITORING," which claims the benefit of U.S. Provisional Patent Application No. 62/657,959, filed Apr. 16, 2018, titled "WIRELESS RF POWER RECEIVER AND SENSOR MODULE FOR MACHINE CONDITION MONITORING," U.S. Provisional Patent Application No. 62/657,960, filed Apr. 16, 2018, titled "TRANSPONDER FOR A WIRELESS RF POWER RECEIVER AND SENSOR MODULE," U.S. Provisional Patent Application No. 62/662,824, filed Apr. 26, 2018, titled "MACHINE CONDITION MONITORING SYSTEM UTILIZING WIRELESS RF POWER TRANSMISSION." The entire contents of each of the above-identified applications are incorporated herein by reference.

This application also incorporates by reference in its entirety commonly owned U.S. patent application Ser. No. 16/384,516, filed Apr. 15, 2019, titled "SYSTEM TO DYNAMICALLY ADJUST SAMPLING AND COMMUNICATION FREQUENCY OF A WIRELESS MACHINE CONDITION MONITORING NETWORK."

TECHNICAL FIELD

This disclosure generally relates to systems and methods for machine condition monitoring.

BACKGROUND

Identifying accurately significant changes in machine performance indicative of an occurred failure, a likely to occur failure, or a future failure (e.g., fault) is an important component of predictive maintenance. In some examples, more than 80% of all complex mechanical equipment can fail accidentally and without any relation to their life-cycle period. Conventional techniques for condition monitoring involve positioning one or more sensors at or near a machine. Each sensor can be configured to monitor one or more condition parameters of the machine. Critical to accurate machine condition monitoring is the reliability of the sensors themselves. For example, without sufficient energy, sensors would experience down-time or even failures, and may go unattended for substantial period of times, in some instances, years.

SUMMARY

In an example, a transponder can be configured to wirelessly communicate with a receiver and sensor module (RSM), wirelessly communicate with a high-speed network, and radio-frequency (RF) power a RSM. The high-speed network can include a wired network such as USB or Ethernet, or wireless network such as a WiFi or cellular network.

In another example, a transponder can include an antenna module that can be configured to transmit radio-frequency (RF) power to a receiver that can be configured to monitor a condition of a machine, and a control module that can be configured to dynamically adjust the RF power based on one of (i) a sensor signal generated by a sensor that can be configured to monitor for one or more events in proximity of the antenna module, and (ii) receiver data generated by the receiver, and a combination of (i) and (ii).

In an example, a system can include at least one sensor that can be configured to monitor one of a machine and/or local machine environment for a physical, electrical and/or chemical quantity. The at least one sensor can be configured to generate data quantifying at least one physical, electrical and/or chemical quantity. The system can further include an antenna module that can be configured to receive radio-frequency (RF) signals one of directed toward the antenna module, stray RF signals, RF signals generated by the machine, low frequency electromagnetic signals generated by the machine, and a combination thereof. The system can further include a harvesting module, e.g., including an antenna, that can be configured to harvest RF, or other frequency, energy from the received signals, and further configured to convert the received signals to electrical energy. The electrical energy can be provided to a storage element for storage and ultimately used by the receiver and sensor module. In some examples, additional or alternative energy sources can be captured and/or converted, including but not limited to, heat, light, mechanical and/or other sources of energy.

The summary is provided merely for purposes of summarizing some example embodiments to provide a basic understanding of some aspects of the disclosure. Accordingly, it will be appreciated that the above described examples should not be construed to narrow the scope or spirit of the disclosure in any way. Other examples, embodiments, aspects, and advantages will become apparent from the following detailed description taken in conjunction with the accompanying drawings.

DETAILED DESCRIPTION

In some examples, the long-term success of machinery performance (e.g., reliability, efficiency, etc.) can rely on condition monitoring. Condition monitoring is a process of monitoring a parameter of condition in machinery (e.g., vibration, temperature, shock, etc.) in order to identify a significant change which is indicative of a developing fault. Accurate machine condition monitoring can be an important component, to identifying, predicting and preventing machine failures. For example, the need to accurately predict excessive wear, functional abnormalities, imminent malfunctions (e.g., of pumps, bearings, turbines, etc.) can be important to the maintenance, and in some instances, timely replacement of machine components. Machine condition parameters need to be accurately measured (or collected) so that predictions can be made as to when maintenance should occur or when a machine should be replaced. The ability to correctly measure machine condition parameters and predict a system failure can reduce unexpected downtime, improve process control, and/or improve overall energy usage efficiency. For example, the progression of bearing failure has been correlated to increased vibration, increased temperature, and increased power consumption. The failure of a bearing can have serious consequences in many applications. Bearing failures may be caused by an ingress of dirt or foreign material, by excessive loading or by lubrication problems.

In some examples, to address energy requirements of a sensor itself, in some industrial environments, each sensor is connected via cabling to an energy source. Energy is continuously delivered via the cabling to provide power to the sensors. However, this need to collect long-term data can be balanced with the manufacturing environment's requirements to reduce cabling, avoid additional infrastructure installations, and minimize touch labor to the sensors or overall data system. The use of cabling and related infrastructure also creates a hazardous environment for workers and thus needs to be avoided. In other industrial environments, wireless sensors with replaceable batteries are used for machine condition monitoring. Although an effective alternative to avoiding the drawback associated with wired sensors, use of batteries requires periodic sensor maintenance such as battery replacement. As such, although the use of battery-powered wireless sensors addresses the drawbacks of wired sensors, these devices can create new problems by requiring periodic replacement of batteries.

Figure 1:
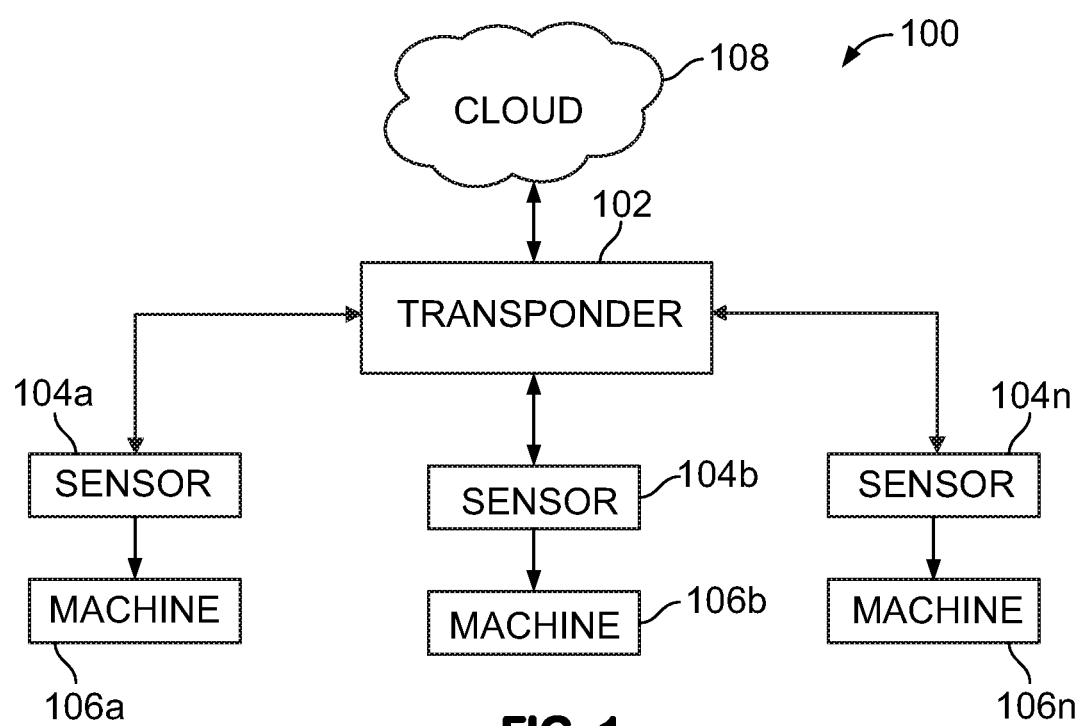
FIG. 1 illustrates an exemplary industrial wireless sensor network system.

FIG. 1 illustrates an exemplary industrial wireless sensor network system 100. The wireless sensor network system 100 can include one or more transponders 102 connected with receiver and sensor modules (RSM) 104a-n. The transponder 102 can connect the RSMs 104a-n to a cloud 108 or other network, e.g., for processing, data storage, communications, etc., of data and/or other information received from the RSMs 104a-n. In some examples, the receiver(s) and sensor(s) of the RSM 104a-n can be incorporated in the same physical module, and in other examples the receiver and sensor can be implemented in separate modules and communicatively coupled together. The RSM 104a-n connect with machines 106a-n to monitor conditions of the machines 106a-n and/or the machines' 106a-n environments. In some examples, the RSM 104a-n can be configured to continually measure (or sample) chemical, electrical and/or physical quantities associated with the machine 106a-n and/or a local machine environment (e.g., air around the machine 106a-n). In some examples, the RSM 104a-n can be configured to generate data quantifying the physical, electrical and/or chemical quantities. As such, the data can include, but not limited to, temperature, vibration, an ultrasonic emission signature, pressure, voltage, current, a nature of the particulates in the vicinity, and chemical vapors such as those from volatile hydrocarbons. A sampling frequency of the RSM 104a-n can be fixed or dynamically adjusted to suit the specific application. Additionally, or alternatively, an enclosure of the RSM 104a-n can be fabricated and/or constructed to have customizable mounting features to accommodate any type of machine, and to facilitate a type of parameter being monitored.

In some examples, the RSM 104a-n can be physically attached to or in the proximity of a machine 106a-n to be monitored for a condition. In some examples, the RSM 104a-n can be configured to be attached to an industrial or commercial machine. The RSM 104a-n can be configured to simultaneously receive both RF power for conversion to useful electrical power and bi-directional RF data communication for reporting the condition of the machine 106a-n under observation. The RSM 104a-n can be configured to receive radio frequency (RF) power, either purposely broadcast or harvested from a surrounding environment, and convert the RF power into electrical energy. The electrical energy can be used by the RSM 104a-n for the purpose of monitoring the parameter(s) for which it is configured. Additionally or alternatively, in some examples other energy sources can be captured and/or converted to electrical energy, including but not limited to, heat, light, mechanical and/or other sources of energy.

The transponder 102 can communicate with the RSM 104a-n to send information from the RSM 104a-n to the cloud 108. The cloud 108 can include services such as Amazon Web Services (AWS), Microsoft's Azure, Google Cloud or similar service. The RSM 104a-n can be configured to communicate wirelessly with each transponder 102. The RSM 104a-n can be configured with an energy harvesting circuit. The energy harvesting system can be configured to capture wireless signals purposely transmitted by the transponder 102 at a corresponding RSM 104a-n, and in some examples, wireless signals in the industrial environment. In some examples, the transponder 102 can be configured to continuously or periodically (e.g., every given amount of time) generate wireless signals. In some examples, the energy harvesting circuit and control unit 300 can be configured to convert wireless signal energy to electrical energy, e.g., direct current (DC), based on the captured wireless signals. The electrical energy can be stored locally at an electrical energy storage element 316 on the RSM 104a-n. In some examples, the electrical energy can be used to provide power to one or more components of the RSM 104a-n, as described herein. In some examples, the energy harvesting circuit can be configured to receive the wireless signals generated by the transponder and continuously provide electrical energy for the RSM 104a-n. Accordingly, the systems and methods described herein include wireless charging of RSM 104a-n configured for monitoring a given machine condition associated with the machine 106a-n.

In some examples, a condition of the machine 106a-n can be monitored without the need for wires or replaceable batteries. In some examples, the system 100 can be configured to utilize an existing wireless network infrastructure in a machine environment by way of a single transponder 102 or a plurality of transponders installed in the proximity of one or more RSMs 104a-n. In some examples, the machine environment can include an industrial facility, a commercial facility, and the like.

Figure 2:
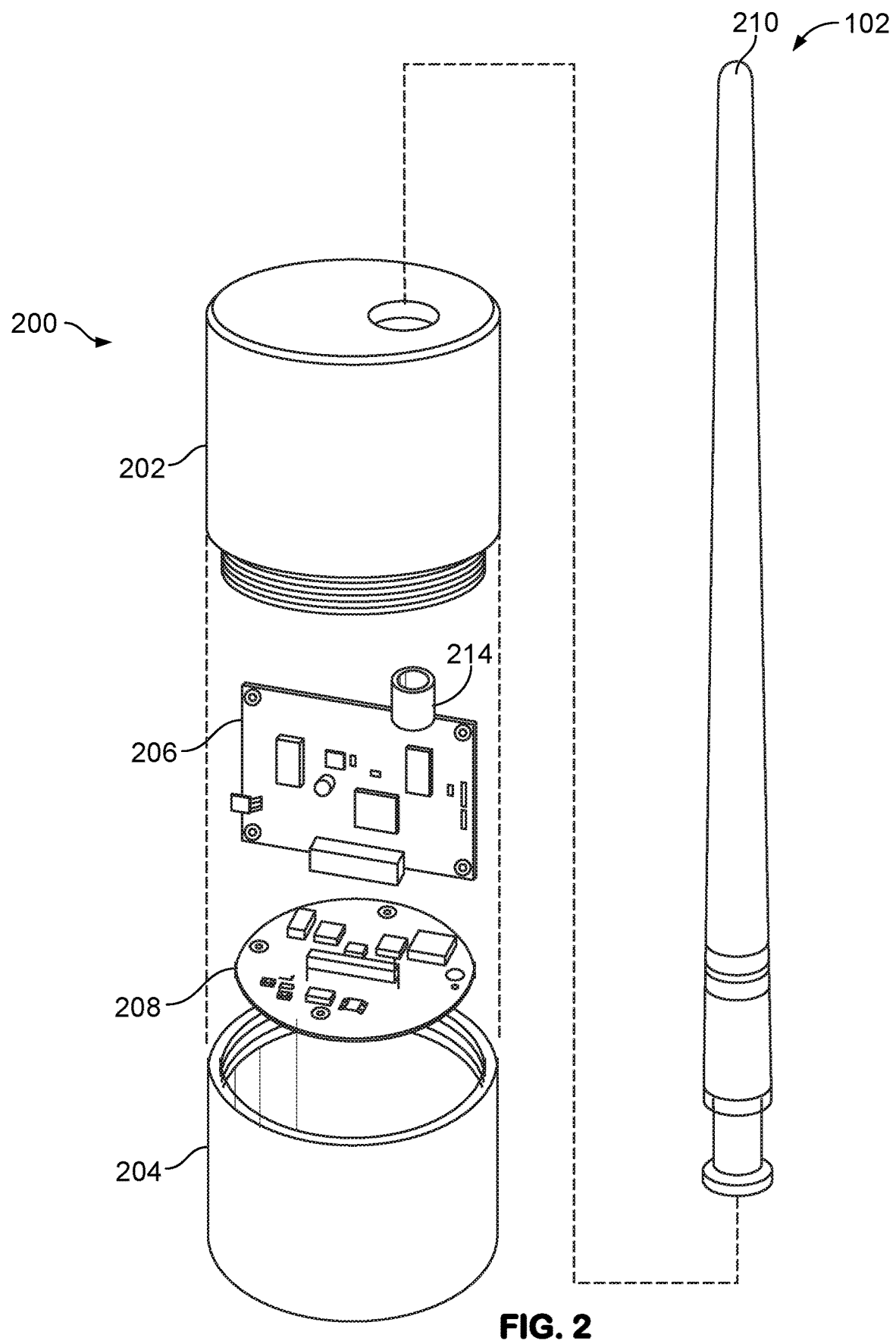
FIG. 2 illustrates an example enclosure of a receiver and sensor module (RSM).

FIG. 2 illustrates an example enclosure 200 of the RSM 104a-n. In some examples, the RSM 104a-n can include a wireless module that be configured to mount to an exterior surface of the machine 106a-n being monitored by means of threads, clamps, crimps, magnets, adhesives and the like. The enclosure 200 can include joined sections 202, 204: e.g., a lower section 204, e.g., of a metallic material, to provide means to mount sensors(s) to the machine 106a-n firmly such that the measured properties, such as physical, electrical and/or chemical properties (e.g., vibration, temperature, audio signature, pressure, voltage, current, chemical vapors, etc.) can be measured by the sensors, and an upper section 202, e.g., made of plastic or other RF transparent material, to provide electromagnetic transparency for RF power and communication signals to transceiver (e.g., using a low-power protocol such an Bluetooth low-energy or similar). In an example, an interior of the enclosure 200 can include a control, communications, and harvesting module (CCHM) 206, a sensor puck module (SPM) 208 and provisions to mechanically secure each module to the enclosure 200.

The CCHM 202 can include an energy harvesting system. In some examples, the energy harvesting system can correspond to an energy harvesting system, as described in U.S. patent application Ser. No. 14/882,754, the contents of which are incorporated herein by reference. The energy harvesting system can be configured to capture either RF signals directed toward the RSM or otherwise stray, unused RF power, conceivably from the machine 106a-n under observation itself, or other ambient sources, to provide a power source for continually sampling and periodically transmitting measured data back to a transponder(s) and/or a centralized computing point (including but not limited to a cloud computing environment provided by AMAZON WEB SERVICES (AMS), or other cloud computing architecture) for analysis.

The CCHM 206 can further include a programmable microcontroller, a real-time clock, and low-power, bi-directional radio transceiver. Addition features include a rechargeable, non-serviceable energy storage device, a universal asynchronous receiver transmitter (UART) port for programming, non-volatile solid-state memory for data storage, and the ability to control power supplied to the SPM 208. In some examples, the SPM 208 is customizable. Once powered, the customizable sensor circuit card can be configured to communicate with the CCHM 206 by way of low-level serial and general purpose (analog voltage and digital control) lines. The customizable SPM 208 can be reconfigured during manufacturing to accommodate the specific sensors required for a given industrial application (e.g., for a particular machine condition). In an example, the sensor circuit card can include a three-axis accelerometer for monitoring machine vibration, a temperature sensor for monitoring machine case temperature, and an ultrasonic microphone for monitoring changes in the machine's acoustic signature.

In some examples, the enclosure 200 can be constructed to environmentally seal the RSM components, and provide a flexible, customizable mounting solution, and support low-power communications transceivers by maintaining radio transparency. The wireless nature of the RSM 104a-n, including a non-serviceable storage element, e.g. the electrical energy storage element 316 described below, can allow the enclosure 200 to be completely sealed, thus preventing liquid or particulate ingress through opening such as replaceable battery covers or signal transmission connectors. The lower section of the enclosure 200, where the SPM 208 can be located can be metallic to facilitate the transmission of measured characteristics to the internal sensors. For example, an internally potted metallic lower section 204 of the enclosure 200 can effectively transmit the machinery's vibration, temperature, and acoustic signatures to the internal sensor of the SPM 208. This lower section 204 of the enclosure 200 can take different forms depending on the type of data being collected and the desired mounting method. For example, the lower section 204 could take the form of a cable clamp to measure current, have a perforated opening to sample the atmosphere for chemical vapor, etc.

The RSM 104a-n can include a programmable microcontroller to implement various power, communications, and data sampling management strategies. These strategies can vary based on the specific application, but they are generally focused on maximizing sampling frequency and data transmission efficiency given the available incident RF power and communication channel availability. The ability to reconfigure the microcontroller allows the same type of RSM 104a-n to interface with a variety of types of SPMs 208, each being customized for a specific application. In some examples, the lower section 204 and/or the upper section 202 can include the CCHM 206, the SPM 208, and provisions to mount them therein. One or more RF power receiving antennas 210 can connect with the CCHM 206, e.g., by way of a circular RF connector 214 or other type of RF connector compatible with antenna 210. In other examples, the antenna 210 may be integrated with the CCHM 206, requiring no connector between the two elements.

In some examples, the antenna 210 can be detachable and replaceable with one having a form and type optimized for linear polarization and vertical orientation. Other antenna configurations optimized for linear polarization and horizontal or angled orientation can be used. In still other examples, antenna configurations optimized for circular polarization can be used. In some examples, the antenna of the RSM 104a-n can be replaceable or reconfigurable to allow for multiple placement orientations and optimization of the RF power source.

Figure 3:
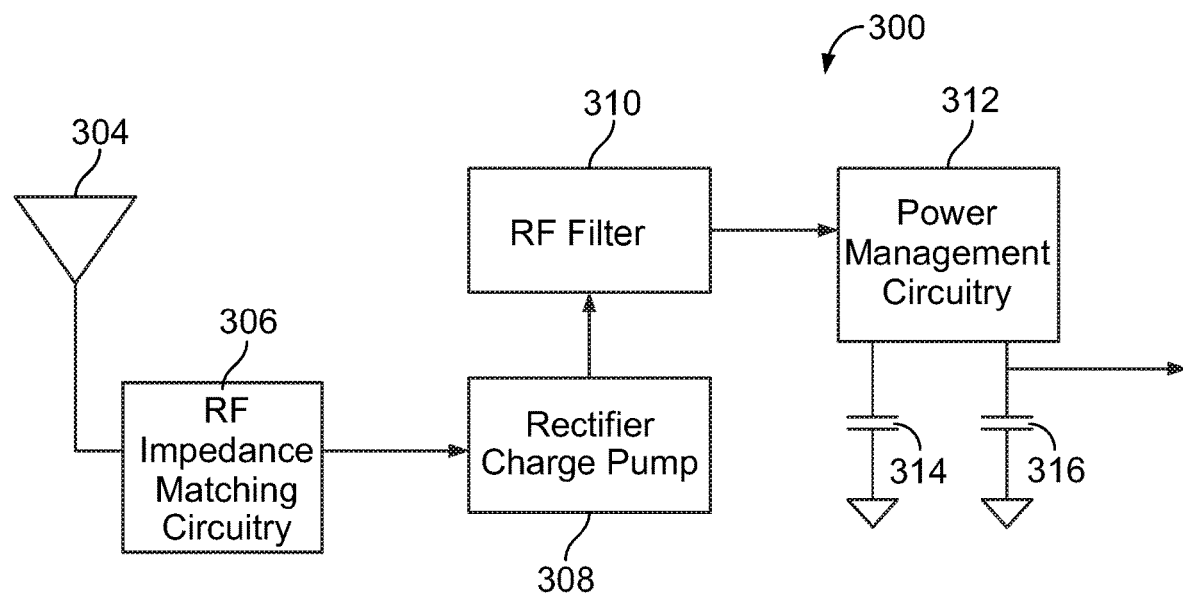
FIG. 3 illustrates an example of a block diagram of a radio-frequency (RF) power harvesting circuit of a control, communications, and harvesting module (CCHM) of the RSM.

Referring to FIG. 3, in an example, an energy harvesting circuit and control unit 300 can include one or multiple receiving antennas 304 that can receive and provide received RF power to an RF impedance matching circuitry 306. The RF impedance matching circuitry 306 can improve delivery of power to a rectifier-charge pump 308. The rectifier-charge pump 308 can be configured to convert an alternating-current (AC) input signal into direct-current (DC) signal to supply a power management circuitry 312 with DC power. The rectifier-charge pump 308 can include a variety of configurations in order to improve the rectification efficiency depending on the application. An RF filter 310 can be configured to provide additional filtering to isolate the high-frequency RF AC from the DC power management circuitry 312.

For the sake of explanation, RF power, e.g., typically about 9 kHz to about 80 GHz, is discussed, but other electromagnetic field frequencies can be harvested and converted to energy. In some examples, one or more antennas and/or antenna modules of the system can be configured to harvest low frequency electromagnetic signals generated by the machine 106a-n, e.g., around 60 Hz, or other lower or higher frequencies than RF, can be harvested and converted using the systems and/or methods discussed herein. For low frequency EM signals, the signal can be dominated by the magnetic field part, and far less by the electric—or electro—field part). Instead of an antenna type energy coupling device, the energy coupling device can include a coil, with or without a ferrous core. A heat source can include a thermoelectric generator (TEG) and a light source can include a photoelectric generator (solar cell) to convert the source into electrical energy.

The power management circuitry 312 can perform several functions. In some examples, the incoming DC voltage can be stored by the power management circuitry 312 in a low-impedance, bulk capacitor 314. This capacitor 314 can allow the accumulation of enough converter RF power to perform subsequent power management and conversion functions. In some examples, the power management circuitry 312 can include a switching voltage converter, such as a "step-up" converter, to increase the voltage supplied to the non-serviceable energy storage component 316, such as an integrated electric double-layer capacitor that can provide extremely high capacitance in a small volume. The electrical energy storage element 316 can serve as the DC supply voltage for the RSM 104a-n. In some examples, the power management circuitry 312 can also include a rechargeable battery as the electrical energy storage element 316.

Figure 4:
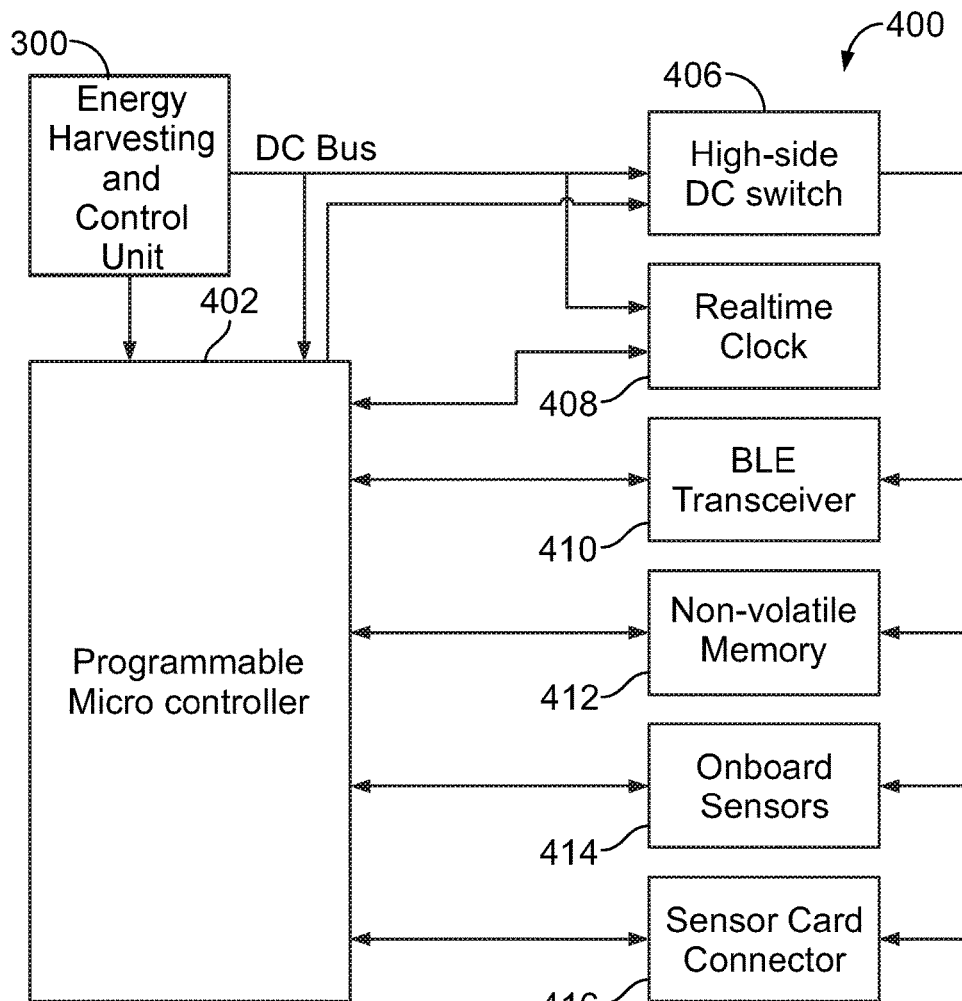
FIG. 4 illustrates an example block diagram of the CCHM of the RSM.

Referring to FIG. 4, in an example, CCHM 206 components of the RSM 104a-n can include the energy harvesting and control unit 300 connected with a programmable microcontroller 402 and several peripherals 406-416 powered by the energy harvesting and control unit 300. The microcontroller 402 and the attached peripherals 406-416 can be selected to minimize power consumption while implementing a data sampling and communications strategy that can be customizable for each application. The RSM 104a-n can spend a majority of its time in "sleep" while the RF energy harvesting power supply accumulates usable energy. During "sleep" mode the microcontroller 402 can be in a low-power state, and be awoken by a real-time clock 408. A high-side DC switch 406 can be off in sleep mode leaving the microcontroller 402 and the real-time clock 408 powered. The real-time clock 408 can have the ability to "wake" the microcontroller 402 at either a certain pre-determined time or after a specific amount of time has passed since the last wake state. In "wake" mode the high-side DC switch can be activated, applying power to the Bluetooth low energy (BLE) transceiver 410, the non-volatile memory 412, the onboard sensors 414, and the SPM connector 416. The microcontroller 402 can transfer bi-directional data to the BLE transceiver for communication to the transponder 102. The non-volatile memory 412 can allow several data samples to be taken, without the need for communication using the BLE transceiver 410, until enough data is accumulated to allow for efficient data transmission back to the transponder 102. The onboard sensors can facilitate easy collection of measurements that can be common across multiple applications, such as temperature, vibration, etc. In an example, the SPM connector card 416 can supply power and communication/control lines to the SPM sensor array, which can be highly customizable based on application needs.

Figure 5:
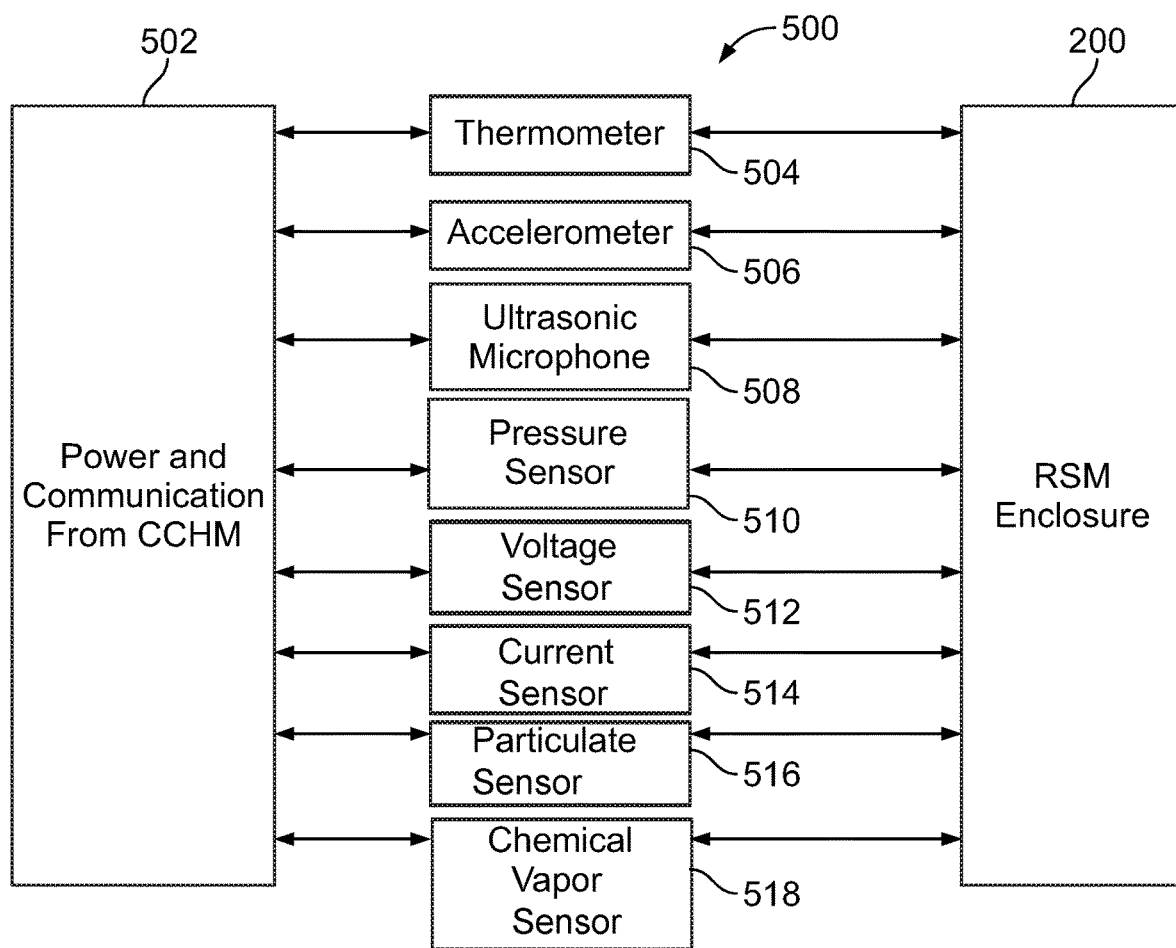
FIG. 5 illustrates an example block diagram of a customizable sensor puck module (SPM) of the RSM.

Referring to FIG. 5, in an example, the SPM 208 within the RSM 104a-n can include a customizable circuit card 500 that can include a variety of sensors in multiple configurations. The following description is just one example of the SPM 208. The RSM 104a-n can be configured to allow for any combination of sensors to be implemented in the SPM 208 and interfaced with existing CCHMs 206. For example, the SPM 208 can be configured with a circuit card that can have a power and communications connector 502 that can interface the SPM 208 with the CCHM 206. A thermometer 504 can be configured to monitor machinery temperature by means of thermal conduction with the exterior enclosure 200. An accelerometer 506 can be configured to monitor machinery vibration by means of mechanical conduction with the exterior enclosure 200. An ultrasonic microphone 508 can be configured to monitor machinery acoustic signature by means of an acoustically-transparent seal through the enclosure 200. A pressure sensor 510 can be configured to monitor pressure by means of a port on the exterior of the enclosure 200. A voltage sensor 512 can be configured to monitor external voltages by means of sealed electrical terminals exterior to the enclosure 200. A current sensor 514 can be configured to monitor AC or DC current by means of a measuring shunt or a magnetic field sensor built into the lower enclosure through which wire(s) can be routed. Particulate sensor 516 and chemical vapor concentration sensor 518 can measure particulate count, size, type, and chemical composition, respectively, of an environment by means of a sampling port. The SPM 208 can implement the appropriate physical interface or attachment to the RSM enclosure 200 to facilitate each physical attribute sensed. Additional or alternative sensors can be used, including but not limited to fluid level and/or fluid condition sensing, e.g., lubricating oil for the machine 106a-n.

Figure 6:
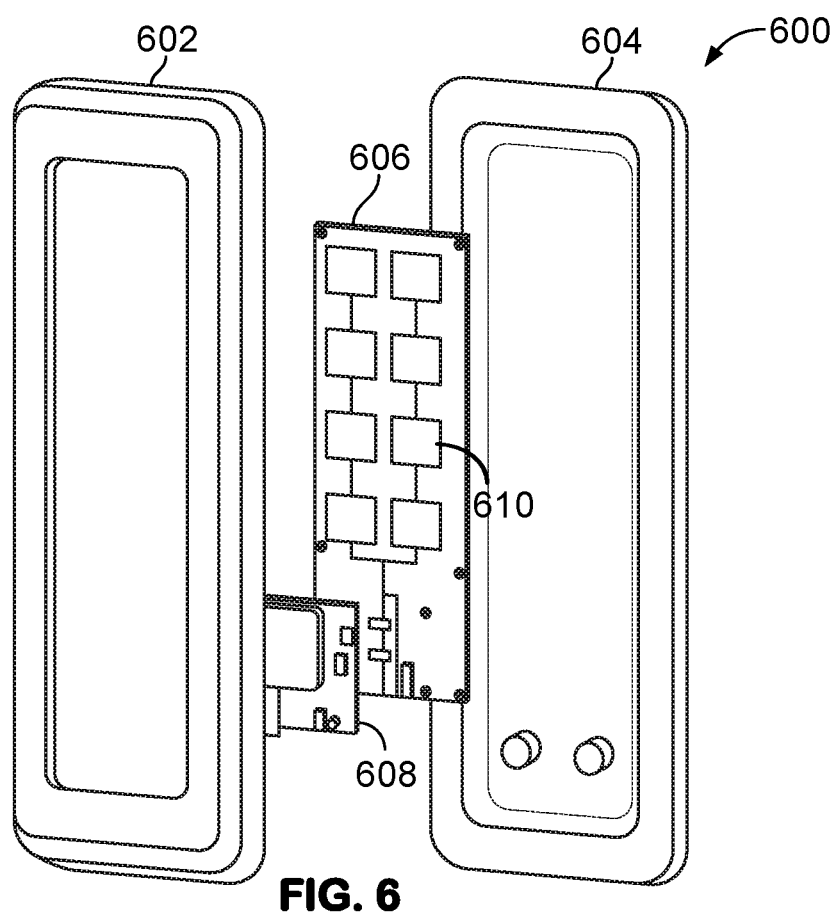
FIG. 6 illustrates an example of a mechanical model representation of a transponder.

FIG. 6 illustrates a mechanical model representation of the transponder 102. The transponder 102 can include an enclosure 600. The enclosure 600 can include a first section 602 and a second section 604. The first section 602 can be fabricated such that the first section is transparent to wireless signals (e.g., RF or other electromagnetic signals). In some examples, the first section 602 can include a transponder control module (TCM) 608 that can include a status indicator, e.g., a light emitting device. The light emitting device, in an example, can correspond to a multi-color light emitting diode. A given color can be used to provide a visual indication to a user. In some examples, the TCM 608 can include a proximity sensor to register the distance of a nearby object, e.g., a laser based, acoustic-based and/or IR based proximity sensor. The first section 602 and the second section 604 can be coupled to one another to seal one or more components of the transponder 102. In some examples, the one or more components can include a transponder antenna module (TAM) 606 and an antenna 610. The antenna 610 can be configured to transmit and receive wireless signals. In some examples, the antenna 610 can be configured to provide wireless signals for one or more sensors. The one or more sensors can correspond to the one or more RSM 104a-n. The antenna 610 can be configured to provide for bi-directional communication between the transponder 102 and the one or more sensors. Additionally or alternatively, the antenna 610 can deliver energy carrying signals to the RSM 104a-n.

Figure 7:
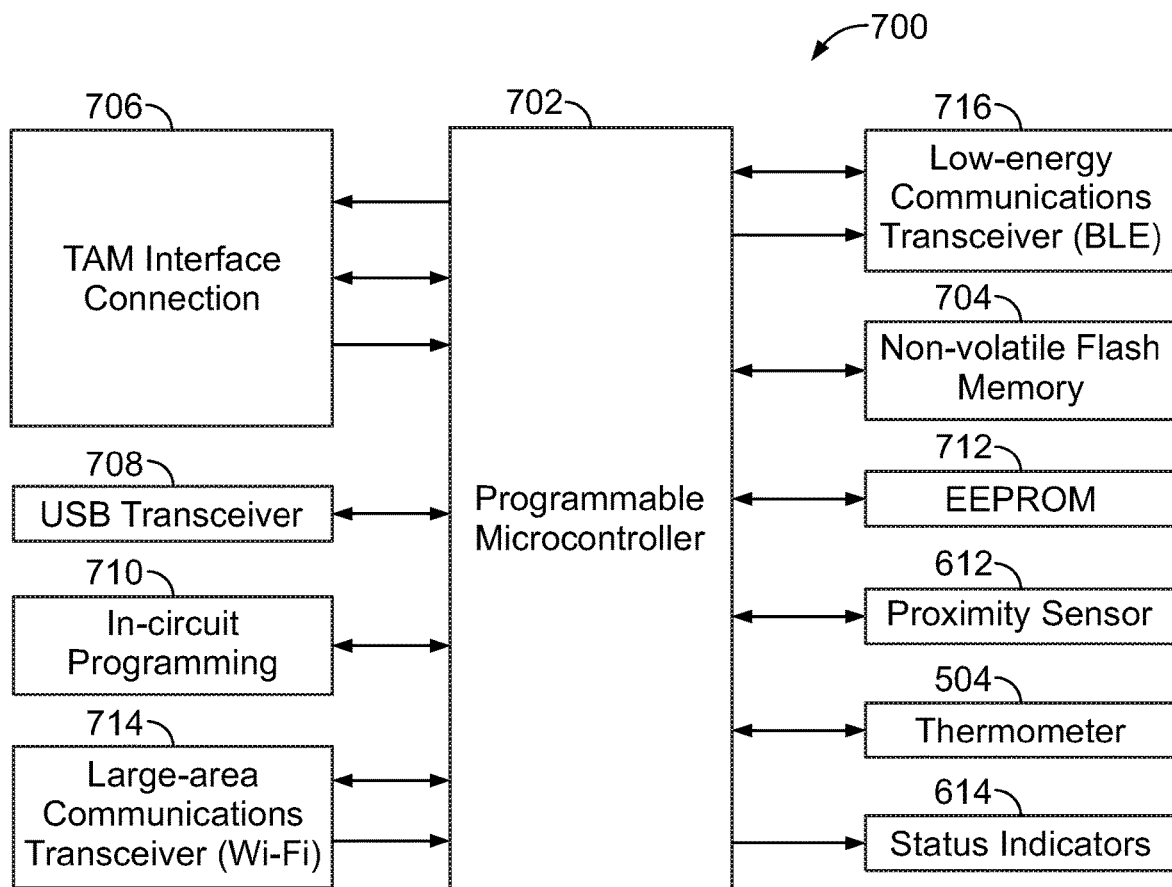
FIG. 7 illustrates an exemplary transponder control module.

FIG. 7 illustrates an exemplary transponder control module 700. In some examples, the control module 700 can correspond to the TCM 608, as illustrated in FIG. 2. The control module 700 can include a controller 702. The controller 702 can be configured to evaluate sensor data generated by one or more sensors (e.g., the one or more RSM 104a-n). In some examples, the controller 702 can be configured to evaluate the sensor data and stored baseline sensor data in memory 704 of the control module. Additionally or alternatively, the sensor data can be evaluated remotely, e.g., on remote data processing devices and/or with cloud computing. The controller 702 can be configured to determine condition parameters for one or more machines (e.g., the one or more machines 106a, 106b, and 106n, as illustrated in FIG. 1) based on the evaluation.

The controller 702 can be configured to provide power and/or operational commands to an antenna module via an interface connection 706. In some examples, the antenna module can correspond to the TCM 608, as illustrated in FIG. 6. An antenna module can include a single antenna or multiple antennas, e.g., as needed to provide communication and/or harvesting. The controller 702 can be configured to via the interface connection 706 to set an RF signal frequency and power level, and RF amplifier gain. In some examples, variable gain amplifiers (VGA) can be used for the driver amplifier. The controller 702 can be configured to monitor a measured reflected RF power signal. The control module 700 can include a universal serial bus (USB) transceiver 708. The USB transceiver 708 can be used to interface with a software configuration tool. In some examples, the controller 702 can be programmed to provide the sensor data to the software configuration tool via the USB transceiver 708.

The control module 700 can include an in-circuit programming connection 710. In some examples, a device can be coupled to the in-circuit programming connection 710. The device can be configured to provide transponder configuration data. The controller 702 can be configured to change one or more operating parameters of the one or more components based on the configuration data. For example, the controller 702 can be configured to one of set the RF signal frequency and power level, and RF amplifier gain, and a combination thereof based on the configuration data. In some examples, the controller 702 can be configured based on the configuration data. For example, the controller 702 can be configured for a given antenna module. As such, the control module 700 can be configured to interface with a plurality of different of antenna modules, each of which can be unique for a given machine condition monitoring application. Components and functions are split between an antenna module and the control module 700 to permit the antenna module to be replaceable to implement a variety of antennas, RF sources, and RF amplifier configurations.

The control module 700 can include electrically erasable programmable read-only memory (EEPROM) 712. In some examples, the EEPROM 712 can be configured to store the configuration data. The controller 702 can be configured to retrieve the configuration data. The controller 702 can be reprogrammed for the given antenna module based on the configuration data. The control module 700 can include one or more wireless transceivers 714, 716. In some examples, the wireless transceiver 714 can be configured to communicate according to a given protocol and the wireless transceiver 716 can be configured to communicate according to another protocol, different than the given protocol. In some examples, the wireless transceiver 714 can include, but not limited to, a WiFi serial transceiver, a cellular transceiver, and a combination thereof. The wireless transceiver 714 can be configured to communicate with a system. In some examples, the system can be on a cloud. The system can be configured as a centralized data storage and processing system according to the systems and methods described herein.

In some examples, the wireless transceiver 716 can include, but not limited to, a Bluetooth transceiver, a ZigBee transceiver, a Bluetooth low-energy (BLE) transceiver, and a combination thereof. The wireless transceiver 716 can be configured to communicate with the one or more sensors. The controller 702 can be configured to generate sensor configuration data. The wireless transceiver 716 can be configured to transmit the sensor configuration data to the one or more sensors. In some examples, the controller 702 can be configured to provide sensor identification data to the wireless transceiver. The wireless transceiver 716 can be configured to transmit the sensor configuration data to intended sensors based on the sensor identification data.

The controller 702 can be configured via the wireless transceiver 716 to one of periodically or continuously monitor nearby sensors for "awake" sensors. Upon discovering one or more awake sensors, the controller 702 can be configured to communicate with the sensors to receive sensor data. In some examples, the controller 702 can be configured to transmit the sensor configuration data. The memory 704, e.g., non-volatile flash memory, can be configured to facilitate storage of large amounts of data, pending transmission of the data to the centralized data storage and processing system or local data analysis by the transponder itself. The proximity sensor can be configured to monitor for objects, including personnel, within the vicinity and in the direction of the emitted RF power. This proximity sensor can be coupled with the measurement of reflected RF power from a TAM interface connection 706 to allow the transponder to function at higher power levels when unobstructed but operate within the established, regulated RF exposure levels when obstructed. In an example, TCM 608 can be configured to monitor the internal temperature of the transponder to maintain safe operational conditions should the environment temperature rise.

Figure 8:
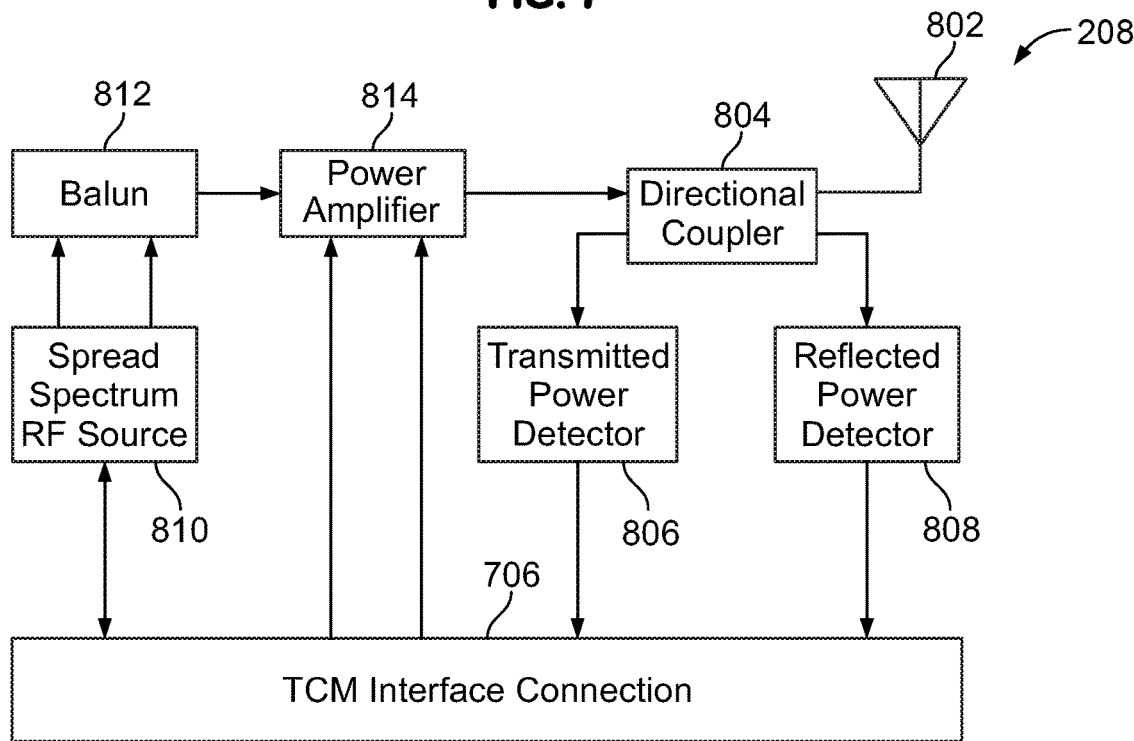
FIG. 8 illustrates an exemplary transponder antenna module.

FIG. 8 illustrates an exemplary TAM, e.g., the TAM 606 in FIG. 6. The TAM 606 can include one or more components such as a RF power transmitter on a separate circuit assembly controlled by the TCM 608. The TCM interface connector 706 can provide a standardized means of supplying power and data signals to the TAM 606. The RF source 810 can be configured to generate the synthesized RF signal across an adjustable spread spectrum to reduce interference with other data communication networks in the same frequency band and to minimize the peak power at any one particular frequency. A balun 812 can be configured to convert a differential signals, e.g., RF signals, into a single-ended signals for input into a power amplifier 814. The power amplifier 814 can increase power of the signal for transmission through the directional coupler 804 and eventual transmission by the power antenna 802. In some examples, multiple stages of amplifier and/or filters can be included as needed. The directional coupler 804 can provide means to sample the transmitted and reflected RF power at a known reduction such that the transmitted power detector 806 and reflected power detector 808 can accurately measure transmitted and reflected power, respectively. The TCM interface connection 706 can send/receive an RF source control, Serial Peripheral Interface (SPI) and/or General Purpose Input-Output (GPIO) signal to the RF source 810, and a DC supply and enable GPIO signal to the power amplifier 814.

Figure 9:
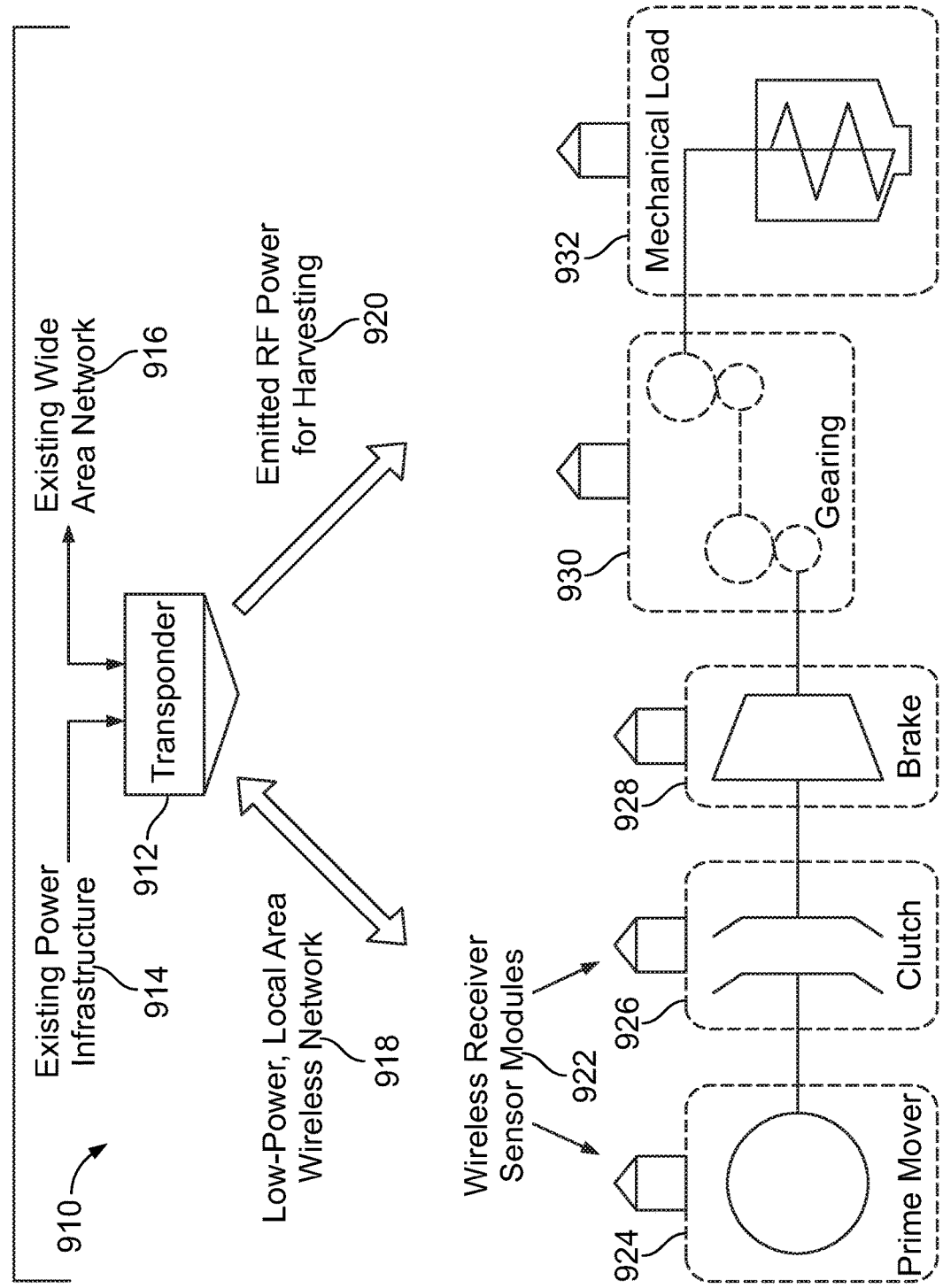
FIG. 9 illustrates an example of installation of system hardware.

Referring to FIG. 9, in an example, a machine condition monitoring system 910 can include a transponder 912, e.g. transponder 600, mounted overhead or affixed to support structure, in the vicinity of several RSMs 922, e.g., RSM's 104*a-n*, mounted directly or in the proximity of the machinery being monitored. The transponder can receive power from an existing power infrastructure 914 of the existing location, such as 120/240 VAC or 24 VDC, and can interface with the existing wide area network, such as wired or wireless Ethernet or WiFi network. The transponder can implement a low-power, local area wireless network for bi-directional communication with a distributed array of RSMs 922. The transponder can simultaneously implement an emitted RF power source that can be broadcasted towards the RSM array for the purpose of reception and conversion into useful DC power. The emitted RF power and local-area wireless network can be broadcast symmetrically, over one or more axis, emanating from the front, RF functional side of the transponder. The transponder can implement an interchangeable mounting bracket and any necessary connectors (e.g., power, wired network, and USB for configuration programming) on the rear or side.

One or more types of RSM 922 can be placed or their corresponding type of machinery to be monitored. For example, it may be of interest to monitor the voltage, current, temperature, vibration, and ultrasonic acoustic signature of an electrical motor (a prime mover 924, as shown in FIG. 9). Another type of RSM 922 with a different sensor configuration can be used to monitor the temperature, via an IR sensor, cycle life, and particulate emissions of a mechanical clutch 926 or a mechanical brake 928, as shown in FIG. 9. A RSM 922 fitted with a multi-axis accelerometer can monitor the condition of a gear box 930, as shown in FIG. 9. Further RSM sensor customization would be possible to appropriately monitor a variety of mechanical loads 932, such as temperature of a stirred mixture, speed of rotation, multi-axis vibration, transparency (e.g., light absorption), etc.

Figure 10:
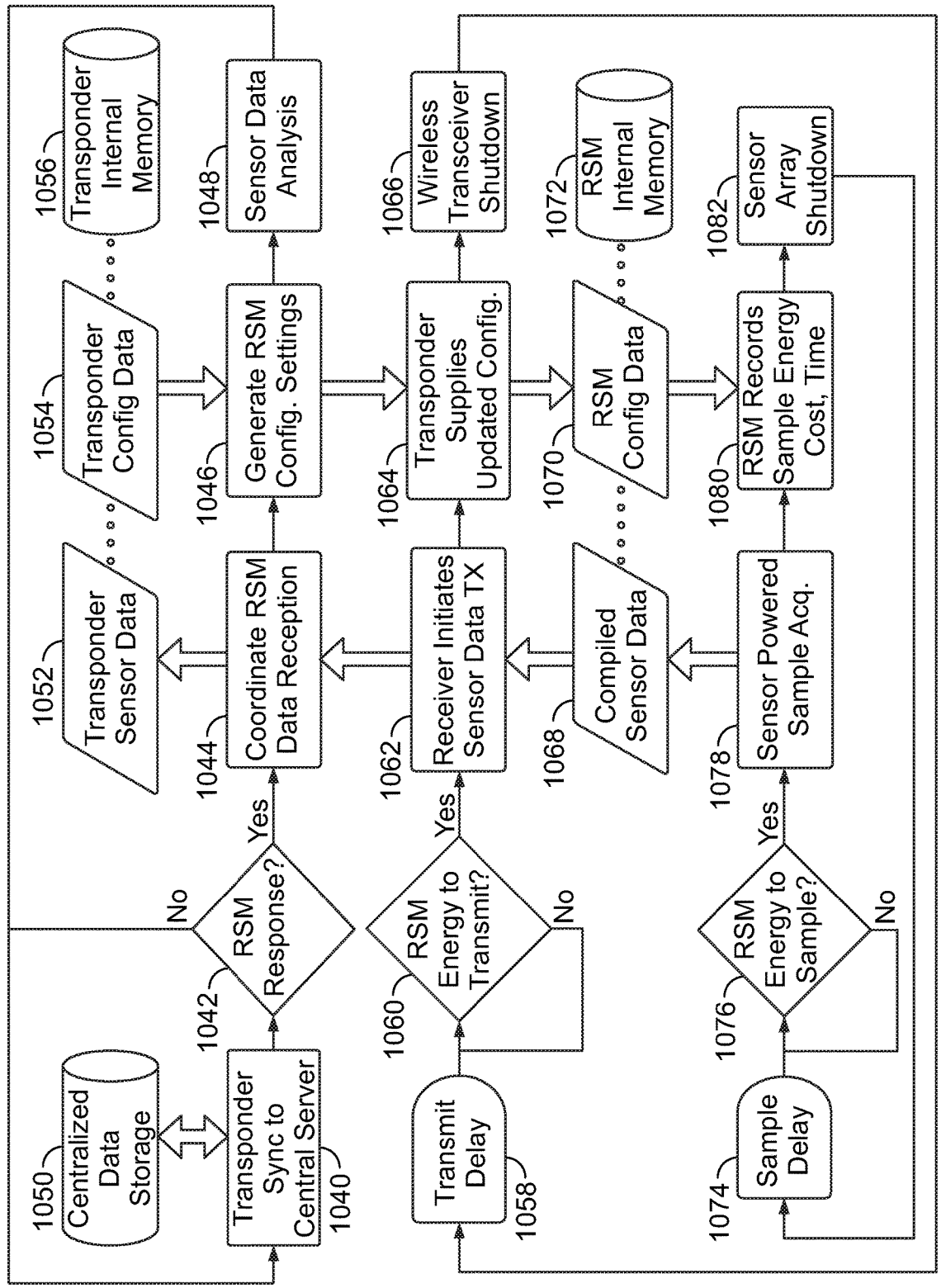
FIG. 10 illustrates an example of a flowchart representation of system-level operational functions and data transmission pathways.

Referring to FIG. 10, in an example, the machine condition monitor data flow can take the high-level form of a plurality of repeating loops. These loops can control the transponder data collection, generation, and analysis functions, the RSM 922 data sampling functions, and the RSM 922 data exchange frequency with the transponder. Within the transponder data management loop, the transponder first waits for a request for communication 1042 from one or multiple RSMs 922. In the case of two or more RSM 922 requesting communication simultaneously, the low-power local area network implemented by the transponder and the RSM 922 can provide means to assign a randomized time interval to each RSM 922 before they may re-issue a request. This serves to mitigate network traffic collisions and, over time, establish a sequential communication pattern among many RSMs 922. Once a request for communication has been received and acknowledged, the transponder can coordinate the reception of RSM sensor data 1044, and the combining of the data received from each RSM 922 into the overall transponder sensor data 1052, which can be stored within the transponder's internal flash memory 1056. The transponder can then generate updated configuration data 1054 to be sent to the RSM 922 as part of the next communication cycle 1046. This configuration data can be a function of the energy spent by the RSM 922 to acquire and transmit the sensor data, information that can be transmitted by the RSM 922 along with the sensor data itself. This can allow the transponder to configure each individual RSM 922 to acquire and transmit the most important type of data more frequently (based on the condition quality of the data itself) and for each RSM 922 to utilize the harvested energy with maximum efficiency.

Within the RSM 922 data transmission loop, the RSM 922 can first check that ample energy has been harvested and accumulated in order to complete a successful transmission before a communication request can be initiated 1060. Energy can be continuously harvested by the RSM 922 so that the delay period 1058, when the low-power, local-area transceiver is powered down, can be used to accumulate stored energy. Once the transmit delay elapses and ample energy from harvesting is stored within the electrical energy storage element 316, the local-area transceiver can power on to send a request for communication with the transponder to transmit 1062 the acquired sensor data 1068 and receive updated configuration settings 1064. Both the compiled sensor data 1068 and the configuration data 1070 can be stored within the RSM internal flash memory 1072. After a complete transmission transaction, the local-area wireless transceiver can be shutdown 1066 and another transmit delay cycle begins 1058.

Within the RSM 922 data sample loop, the RSM 922 can first check that the sample delay 1074 has elapsed and ample energy from harvesting is stored within the RSM 922 before initiating a data sample 1076. Once started, the sensor sample acquisition 1078 can be performed according to the RSM configuration data 1070 received and stored in the RSM internal memory 1072 during the previous communication cycle with the transponder. Data from one or multiple sensors 1068 can be compiled in the RSM internal memory 1072 for transmit to the transponder at a later time. The RSM configuration data 1070 can include data that can define the data sample loop, such as sample delay time 1074 (for each individual sensor in the array) and data to be recorded about the sample acquisition 1080, such as the energy and time cost to perform the sample. Once the sample data is acquired, the sensor array can be configured to shutdown 1082 and the next sample delay 1074 begins.

Figure 11:
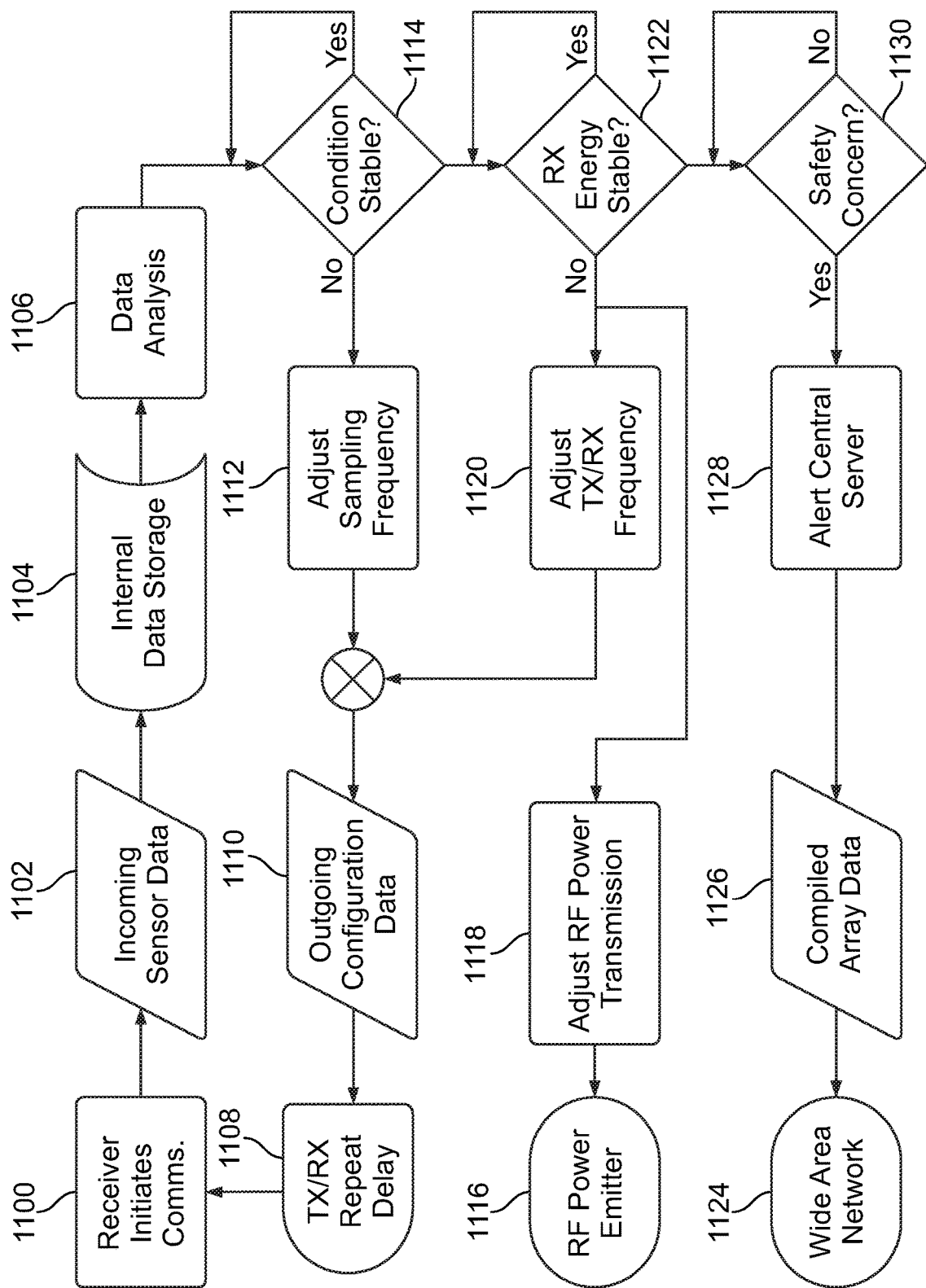
FIG. 11 illustrates an example of a data flow diagram of a transponder.

Referring to FIG. 11, in an example, the transponder data flow may be diagramed in more detail. The transponder data flow process can begin with the RSM initiating communication 1100 and the transponder 102 receiving the incoming acquired sensor data 1102. The transponder 102 can record the sensor data within its internal data storage 1104 for further analysis 1106. The transponder can be capable of making multiple determinations based upon the received sensor data. The transponder 102 can be configured to make a preliminary assessment of the machine condition 1114 locally, without the need to transmit the data back to the cloud 108. In some examples, the cloud 108 can include a centralized data storage and processing (CDSP) server. For example, the transponder 102 can be capable of implementing low-level functions, such as basic analysis of acquired data, adjustment of the RSM data sampling strategy, and implementing emergency shutdown limits, the cloud 108 can implement the high-level data-analysis functions of the machinery condition monitoring system. The cloud 108 can coordinate communications and data sampling strategies between multiple transponders to facilitate the monitoring of large, cross-functional machinery setups. The cloud 108 can also provide complex data visualization and end-of-life prediction tools based on aggregated information from the complete installation site. Maintenance work orders can then be issued automatically, prioritized for the machinery nearest to failure and scheduled to minimize process downtime.

The functionality can allow the transponder 102 to adjust the sampling frequency 1112 as well as provide an alert to cloud 108 that this particular sensor data set can be flagged for further analysis. The transponder 102 can be configured to assess the amount of RSM 922 stored energy spent in acquiring the sampled data 1122 and the amount of energy spent transmitting the stored data back to the transponder. It should be noted that the RSM 922 can include the amount of harvested and stored electrical energy as part of the data transmitted back to the transponder 102. The transponder 102 can generate updated RSM configuration data 1110 based on both machine condition, specifically the possible need to sample that particular type of data to more closely monitor machines 106a-n that may be close to a service requirement, and the power requirement of transmitting that data back to the transponder 102, and thus the cloud 108 for analysis, more frequently.

Since the transponders analysis of the data can require more time than the relatively quick (for RSM energy conservation) sequence to transmit the acquired sensor data, the updated RSM 922 configuration data would be relayed back to the RSM 922 after the next RSM transmit delay 1108. The transponder 102 can be configured to make adjustments to itself based upon the analysis of the transmitted sensor data. In some examples, such as monitoring machines 106a-n that is close to failure, starting up, or shutting down, the transponder 102 can be configured to temporarily adjust 1118 the emitted RF power 1116 to facilitate more frequent data acquisition and communication with the RSMs 922. Additionally, the transponder 102 can be configured to identify a set of pre-programmed safety concerns 1130 in order to quickly alert an alert center server 1128, e.g., implemented by the cloud 108, by sending the compiled sensor array data 1126 out of the wide area network 1124 to any pertinent entities, such as a safety shutdown device, a maintenance group for prioritizing a work order, etc.

Figure 12:
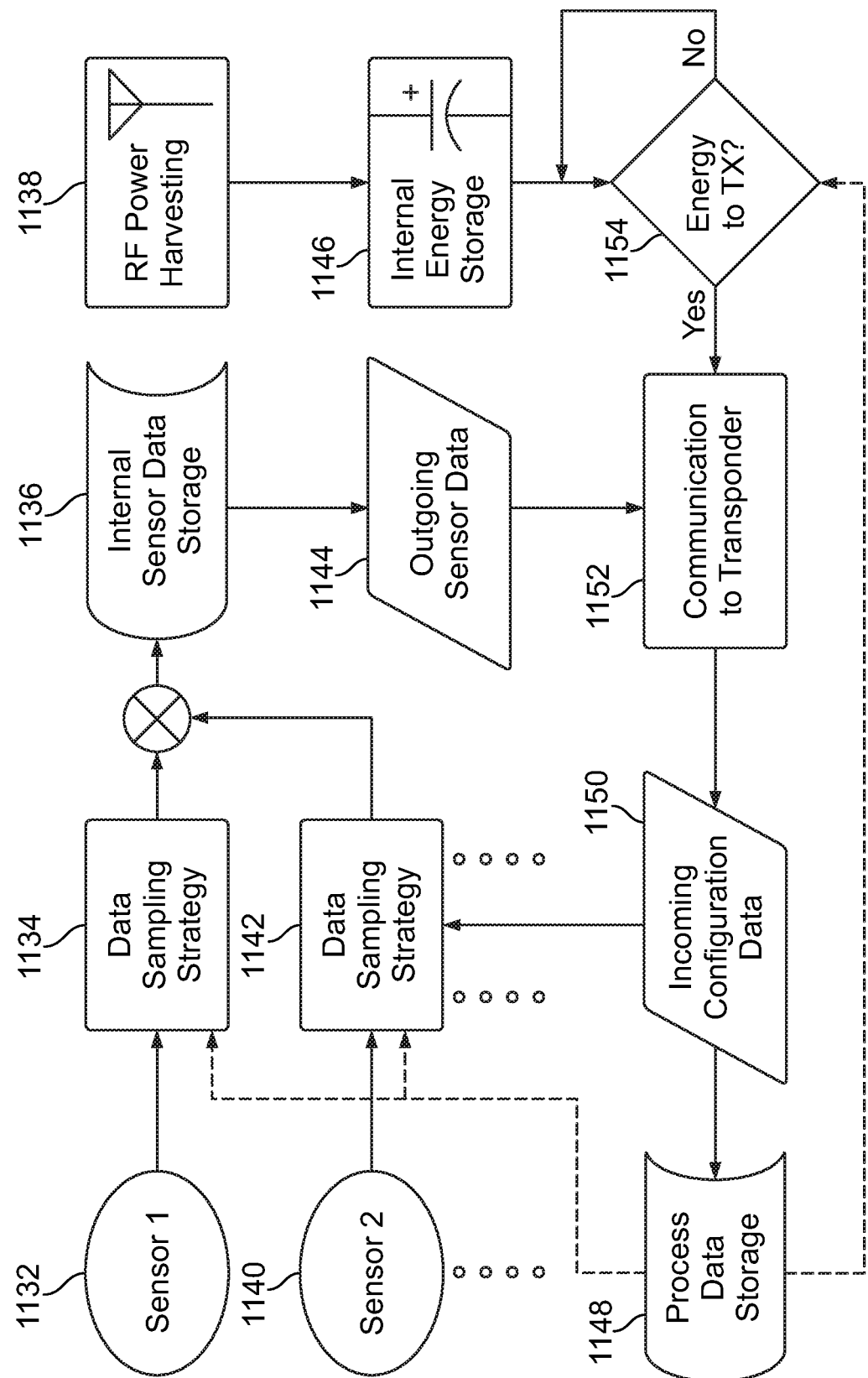
FIG. 12 illustrates an example of a data flow diagram of a receiver and sensor module.

Referring to FIG. 12, in an example, an RSM data flow may be described in more detail. An RSM 922 can include a variety of sensors each with their own unique sampling strategy and frequency, since a given RSM 922 can take multiple forms, configured with different sensor puck modules (SPM) and customizable control, communications, and harvesting modules (CCHM). The RSM 922 can continually implement these data sampling strategies 1134, 1142 on their respective sensors 1132, 1140, accumulating the measurements in the RSM's 922 internal sensor data storage 1136. Simultaneously, RF power can be harvested 1138 from the environment, including reception of the RF power emitted by the transponder 102, to be converted to useful DC electrical power and stored with an electrical energy storage element 316, e.g., internal energy storage 1146. Once enough energy has been accumulated to complete a full transmit cycle 1154, the RSM 922 can be configured to compile the outgoing sensor data 1144 and initiate a communication cycle 1152 with the transponder 102. The incoming configuration data 1150, which can be generated by the transponder 102 based upon the analysis of the transmitted sensor data and data acquisition energy costs, can be received and stored within the RSM's 922 internal process data storage 1148. The dashed lines in FIG. 12 can indicate how the RSM 922 can be programmed to reconfigure both the sensor data sampling strategies and the data transmission criteria based upon reception of updated configuration data.

Figure 13:
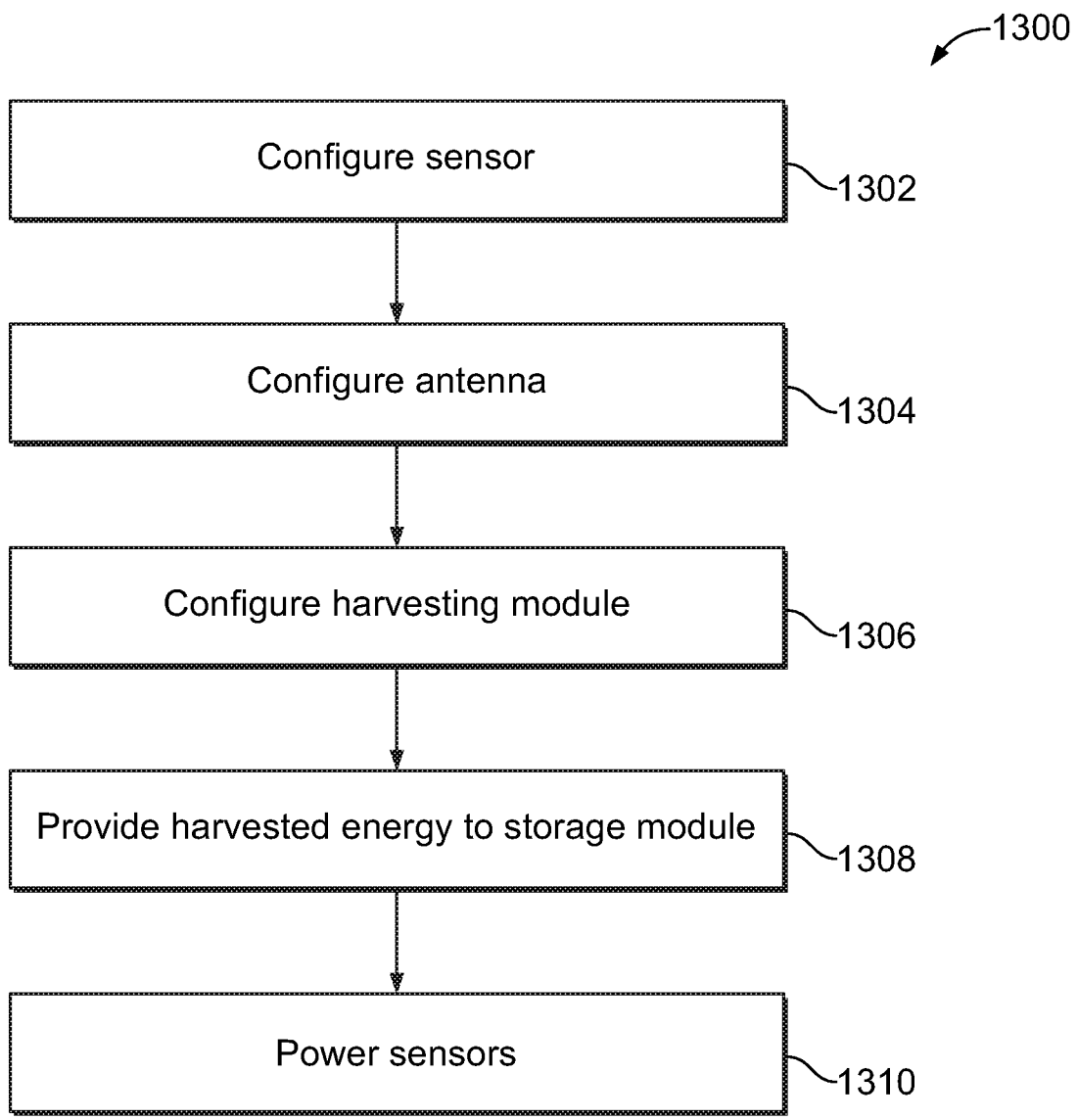
FIG. 13 is a flow diagram illustrating an exemplary method for machine condition monitoring.

FIG. 13 is a flow diagram 1300 illustrating an exemplary method for machine condition monitoring. A sensor can be configured to monitor one of a machine 106a-n and/or local machine environment for a physical, electrical and/or chemical quantity (1302). The at least one sensor can be configured to generate data quantifying the physical, electrical and/or chemical quantity. The system can further include an antenna module that can be configured to receive radio-frequency (RF) signals directed toward the antenna module, stray RF signals, RF signals generated by the machine 106a-n, low frequency electromagnetic signals generated by the machine 106a-n, and/or a combination thereof (1304). The system can further include a harvesting module that can be configured to harvest RF energy from the received RF signals, and further configured to generate electrical energy based on the harvested RF energy (1306). The harvested electrical energy can be provided to the electrical energy storage element 316 for storage (1308). The sensors can be powered with the stored energy (1310).

What have been described above are examples. It is, of course, not possible to describe every conceivable combination of elements, components, or methods, but one of ordinary skill in the art will recognize that many further combinations and permutations are possible. Accordingly, the disclosure is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A transponder comprising: an antenna module configured to transmit radio-frequency (RF) power to a receiver configured to monitor a condition of a machine, wherein the transponder is remotely disposed away from the receiver and the transponder is configured to connect the receiver directly to a cloud or other network for processing data or other information received from the receiver, wherein the antenna module is configured to provide a feedback signal to the control module, the feedback signal providing a measure of the RF power transmitted by the antenna module, the control module being configured to one of safety limit the transmitted RF power and shut down the antenna module to prevent damage from reflected RF power; and a control module configured to dynamically adjust the RF power based on one of (i) a sensor signal generated by a sensor configured to monitor for one or more events in proximity of the antenna module, and (ii) receiver data generated by the receiver, and a combination of (i) and (ii).

2. The transponder of claim 1, wherein the antenna module is configured to receive the receiver data based on a low-energy wireless network protocol from the receiver.

3. The transponder of claim 2, wherein the antenna module receives condition data generated by the receiver according to one of a Bluetooth, Bluetooth low energy (BLE), and a combination thereof.

4. The transponder of claim 1, wherein the one or more events comprises detecting a presence of a human within a given distance of the antenna module.

5. The transponder of claim 1, wherein the one or more events comprises detecting excessive reflected RF power.

6. The transponder of claim 1, wherein the control module is further configured to generate control data, the antenna module being configured to transmit the control data to the receiver to control one or more functions of the receiver.

7. The transponder of claim 6, wherein the control data comprises one of data frequency measuring information, transmission timing for the receiver, condition monitoring parameters, and a combination thereof.

8. The transponder of claim 6, wherein the receiver adjusts a data transmission frequency to maximize data sampled by the receiver based on the control data.

9. The transponder of claim 1, wherein the antenna module is configured to receive condition data generated by the receiver characterizing one or more chemical, electrical and physical quantities associated with the machine and/or a local machine environment.

10. The transponder of claim 9, wherein the condition data comprises one of a temperature, a vibration, an ultrasonic acoustic signature, pressure, voltage, current, a nature of particulates in the local machine environment, chemical vapors, and a combination thereof.

11. The transponder of claim 1, wherein the antenna module and the control module are mounted within an enclosure.

12. The transponder of claim 11, wherein the enclosure is configured to remove heat generated by one of the antenna module, the control module, and a combination thereof.

13. The transponder of claim 1, wherein the receiver that monitors the condition of the machine resides in a remote sensor.

14. The transponder of claim 1, wherein the remote sensor is directly coupled to the machine to monitor the condition of the machine.

15. The transponder of claim 1, wherein the RF power transmitted to the receiver are within a spectrum of 9 kHz to at least 80 GHz, and the low frequency electromagnetic signals are in an alternating-current (AC) range.

16. The transponder of claim 1, wherein the controller module is coupled to a proximity sensor which measures distance of a nearby object using a sensor type comprising one of: optical, acoustic and infrared, and to allow the transponder to function at high power levels when unobstructed.

17. The transponder of claim 16, wherein the RF power transmitted to the antenna module of the sensor is dynamically adjusted in response to the quantified data generated by the sensor.

18. The transponder of claim 1, comprises a RF source to generate synthesized RF signal across an adjustable spectrum to reduce interference with other data communication networks in a same frequency band and to minimize peak power at any one particular frequency.

19. The transponder of claim 18, wherein the RF source is coupled to a balun to convert differential signals into single-ended signals for transmission.

* * * * *